Patented Mar. 3, 1931

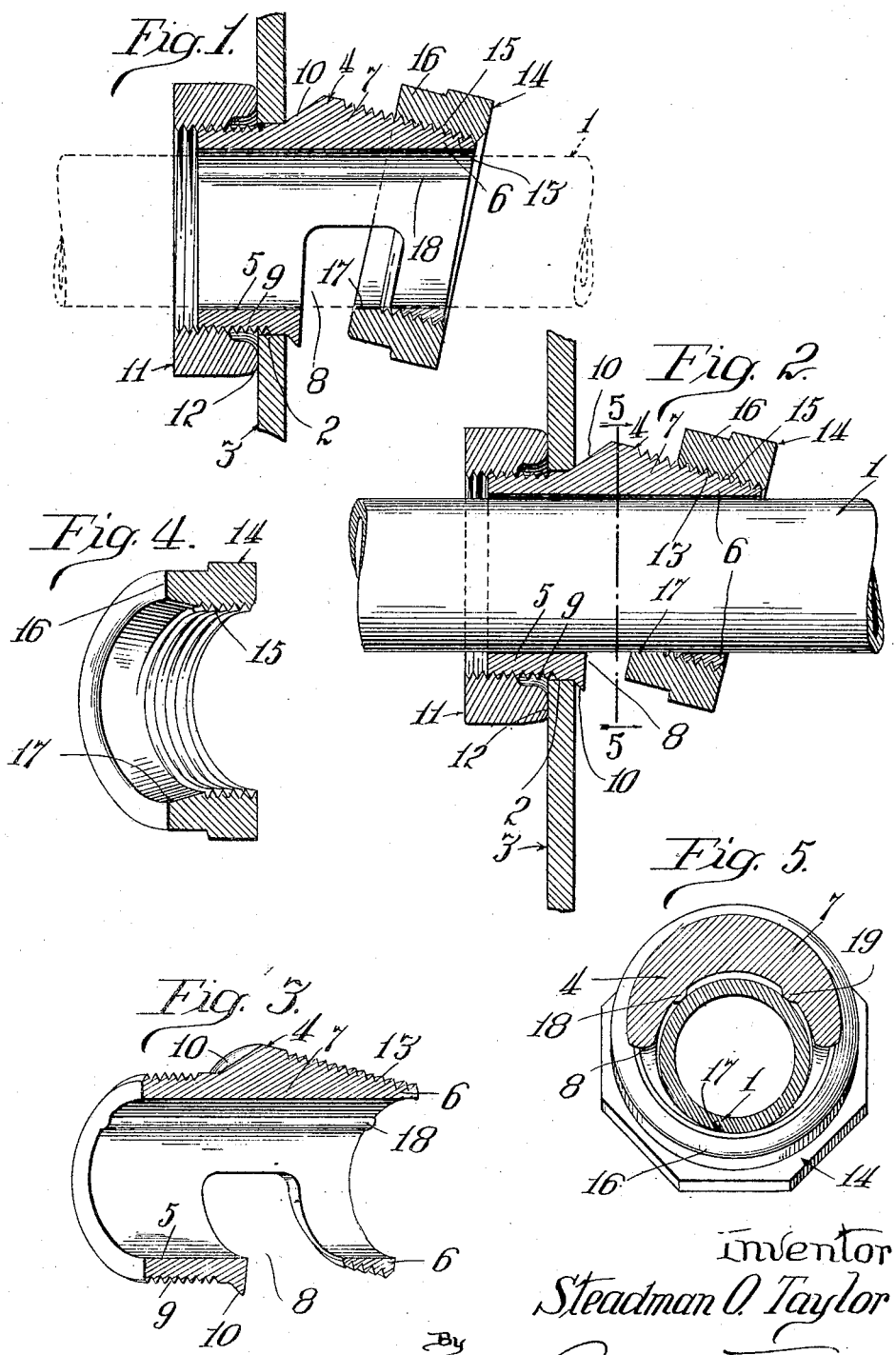

1,794,476

UNITED STATES PATENT OFFICE

STEADMAN O. TAYLOR, OF ST. LOUIS, MISSOURI

PIPE CLAMP

Application filed August 1, 1928. Serial No. 296,740.

This invention relates to new and useful improvements in pipe clamps, and more particularly to a pipe clamp adapted to support and hold in place an air-line pipe or similar pipe beneath a railway car.

In order to supply the motor fluid for operating the brakes and signals, certain lines of piping are maintained beneath the railway cars, the pipe lines on each individual car being connected with similar lines on the adjacent cars by suitable flexible couplings at the ends of the cars. These pipes usually project through holes in the transverse diaphragms of the body bolsters. The under frame construction of the car comprises a plurality of transversely extending vertical metallic plates or diaphragms, and the pipes are usually supported in openings in these plates. It is essential that the pipes not only be supported, but that they be held securely against jolting movements and against lengthwise shifting movements caused by the abrupt changes in the movements of the car as it travels along the tracks.

The present invention relates to a new and improved form of pipe clamp for securing one of these pipes in one of the vertical plates or diaphragms of the car frame, as hereinabove referred to.

The general object of the invention is to provide a clamp which surrounds a portion of the pipe, and which is provided with separate means for securing the clamp to the fixed plate of the car frame and for securing the clamp to the pipes. The clamp comprises two separate annular portions which are connected by an arcuate portion extending along one side of the pipe. Both annular portions are externally threaded and each receives a clamping nut. One of the annular portions has an external surface substantially parallel with the external surface of the pipe, and the nut thereon cooperates with a shoulder at one end of the annular member for securing the clamping device in the fixed plate. The external surface of the other annular member is cylindrical, but the axis of this cylinder is inclined at an acute angle to the axis of the pipe so that when the nut is rotated on this annular portion, it will move into engagement with a portion of the pipe to clamp the pipe between the nut and a portion of the threaded member.

Other objects and advantages of the invention will be more apparent from the following detailed description of one approved form of the device.

In the accompanying drawings:

Fig. 1 is a vertical longitudinal section through the pipe clamp, before the pipe is secured therein.

Fig. 2 is a view similar to Fig. 1 showing the pipe in place and the clamp moved to clamping position.

Fig. 3 is a perspective view, in central section, of the threaded member of the clamp which surrounds the pipe.

Fig. 4 is a perspective, in central section, of the pipe-engaging nut.

Fig. 5 is a transverse section taken substantially on the line 5—5 of Fig. 2.

At 1 is shown a section of the pipe, which is adapted to be passed through a circular opening 2 in the metal plate or diaphragm 3, which forms a portion of the under frame of the car. The opening 2 is sufficiently large to receive one of the annular elements of the pipe clamp, as hereinafter described.

The main tubular element 4 of the pipe clamp comprises an annular portion 5 and a second annular portion 6, the portions 5 and 6 being connected by an arcuate portion 7, which extends along one side of the pipe 1. A single continuous cylindrical passage of somewhat greater diameter than the external diameter of pipe 1, extends through the two annular elements 5 and 6, the inner surface of the arcuate connecting member 7 forming a continuation of this same cylindrical surface. A pair of interior spaced apart ribs 18 and 19 extend longitudinally of the tubular element, at the side connected by the member 7. This is best shown in Figs. 3 and 5. The member might be considered as a singular tubular member, with an irregular outer surface, but a continuous cylindrical inner surface, (except for the ribs 18 and 19) a portion of the member being cut away at one side, as indicated at 8, Fig. 3, so as to leave the arcuate portion 7 connecting the two end annular portions 5 and 6.

The outer surface of the annular portion 5 is cylindrical and substantially parallel to the inner surface and to the outer surface of pipe 1, and is threaded, as indicated at 9. An outwardly sloping shoulder 10 is formed at the inner end of the ring 5, this shoulder being adapted to be engaged in one end of opening 2 in plate 3, and a nut 11 threaded on the outer surface 9 of ring 5 has a crowned inner end 12 adapted to be clamped against the opposite face of plate 3.

The outer surface of annular portion or ring 6 and also of the arcuate connecting member 7, is also cylindrical, but the axis of this cylinder is inclined to the axis of the pipe 1, so that this surface, if extended, would intersect the surface of the pipe where the member 4 is cut away at 8. This cylindrical surface is threaded at 13 to receive a nut 14. A portion of the inner surface of this nut 14 is threaded internally at 15 to engage the threads 13, and has a ring extension 16 projecting toward plate 3, with an inner surface 17 beveled at such an angle that it will conform substantially to the outer surface of pipe 1 when the nut 14 is screwed inwardly, as shown in Fig. 2.

The pipe clamp is first assembled, as shown in Fig. 1, with the portion 5 projecting through opening 2 in plate 3, and the nuts 11 and 14 partially screwed into position, as shown in Fig. 1. The pipe 1 may now be placed in position by sliding same through the member 4, as indicated in Figs. 1 and 2. By tightening the nut 11, the shoulder 10 will be drawn against one surface of plate 3 and the crowned face 12 of nut 11 will be drawn against the opposite surface of the plate so as to securely lock the pipe clamp in position in the supporting plate 3. The nut 14 is now screwed inwardly until the inner surface 17 in the ring extension 16 engages with one side of pipe 1, drawing ribs 18 and 19 at the opposite side of ring 6 and arcuate portion 7, into firm engagement with the opposite side of pipe 1. The nut 14 will be screwed in until the pipe is clamped firmly in place. A three point grip on the pipe will be obtained as indicated at 17, 18 and 19, Fig. 5. It will be apparent that any attempted lengthwise movement of the pipe 1 will only serve to cause a further canting of the inclined locking members 6 and 14, thus tightening the grip upon the pipe. It is not essential that the ribs 18 and 19 extend the complete length of the element 4, since any sort of spaced projections within annular member 6 would be sufficient for the purpose. The ribs might even be omitted entirely and the inner surface of arcuate member 7 and the adjacent portion of the annular member 6 clamped directly to the pipe.

It will be apparent that numerous modifications might be made in the form and proportions of this device, and it is to be understood that all such modifications and equivalent constructions come within the scope of this invention as defined by the following claims.

I claim:

1. A pipe clamp comprising a portion adapted to be secured to a fixed plate, an annular portion adapted to surround the pipe, and a portion arcuate in cross section connecting the first portion to the annular portion whereby a portion of the pipe is left exposed opposite the arcuate portion of the clamp, the annular portion having a threaded external cylindrical surface the axis of which is inclined at an acute angle to the axis of the pipe, and a nut threaded on this portion and adapted to be rotated into engagement with the exposed portion of the pipe.

2. A pipe clamp comprising a member adapted to surround the pipe and be clamped in an opening in a fixed plate, the member having a portion projecting along one side of the pipe at one side of the plate and terminating in an annular member surrounding the pipe, a section of the pipe remaining exposed opposite the projecting portion of the clamp and adjacent the annular member the annular member having an external threaded cylindrical surface which if extended would intersect the pipe at an acute angle, and a nut threaded on this annular member and adapted to be screwed into engagement with the pipe to clamp the pipe between the nut and the projecting portion of the member.

3. A pipe clamp comprising a member formed of two annular portions adapted to surround the pipe, the two annular portions being connected by an arcuate portion extending along the pipe at one side thereof the opposite side of the pipe being exposed, each annular portion having an external threaded cylindrical surface, one of these surfaces being substantially parallel with the external surface of the pipe and adapted to extend through an opening in a fixed plate, there being a shoulder at one end of this annular portion adapted to engage the plate at one end of the opening, a nut threaded on the annular portion and adapted to engage the opposite side of the plate, the threaded external surface of the other annular portion being inclined at an acute angle to the pipe so as to intersect the same if extended, and a nut threaded on this portion so that when screwed inwardly it will engage the exposed side of the pipe between the two annular members.

4. A pipe clamp comprising a member formed of two annular portions adapted to surround the pipe, the two annular portions being connected by an arcuate portion extending along the pipe at one side thereof the opposite side of the pipe being exposed, each annular portion having an external threaded cylindrical surface, one of these surfaces being substantially parallel with the external surface of the pipe and adapted to extend through an opening in a fixed plate, there being a shoulder at one end of this annular portion adapted to engage the plate at one end of the opening, a nut threaded on the annular portion and adapted to engage the opposite side of the plate, the threaded external surface of the other annular portion being inclined at an acute angle to the pipe so as to intersect the same if extended, this threaded surface also extending along the outer surface of the arcuate connecting portion, and a nut threaded on these portions so that when screwed inwardly it will engage the exposed portion of the pipe between the annular portions at the side thereof opposite the arcuate portion.

5. A pipe clamp comprising a member formed of two annular portions adapted to surround the pipe, the two annular portions being connected by an arcuate portion extending along the pipe at one side thereof the opposite side of the pipe being exposed, means for securing one of the annular portions within the opening in a fixed plate, the externally threaded cylindrical surface of the other annular portion being inclined at an acute angle to the surface of the pipe so as to intersect the same if extended, and a nut threaded on this portion so that when rotated inwardly it will engage the exposed portion of the pipe between the two annular members.

6. A pipe clamp comprising a member formed of two annular portions adapted to surround the pipe, the two annular portions being connected by an arcuate portion extending along the pipe at one side thereof, the opposite side of the pipe being exposed, means for securing one of the annular portions within the opening in a fixed plate, the externally threaded cylindrical surface of the other annular portion being inclined at an acute angle to the surface of the pipe so as to intersect the same if extended, this threaded surface also extending along the outer surface of the arcuate connecting portion, and a nut threaded on these portions so that when rotated inwardly it will engage the exposed surface of the pipe between the two annular portions.

7. A pipe clamp comprising a portion adapted to be secured to a fixed plate, an annular portion adapted to surround the pipe, and a portion arcuate in cross section connecting the first portion to the annular portion, the pipe being exposed at the side opposite the arcuate portion of the clamp, the annular portion having a threaded external cylindrical surface, the axis of which is inclined at an acute angle to the axis of the pipe, a nut threaded on this portion and adapted to be rotated into engagement with the pipe at one side thereof, and a pair of spaced inwardly extending projections within the annular member positioned to be drawn into engagement with the side of the pipe opposite that engaged by the nut.

8. A pipe clamp comprising a portion adapted to be secured to a fixed plate, an annular portion adapted to surround the pipe, and a portion arcuate in cross section connecting the first portion to the annular portion, the pipe being exposed at the side opposite the arcuate portion of the clamp, the annular portion having a threaded external cylindrical surface, the axis of which is inclined at an acute angle to the axis of the pipe, the outer surface of the arcuate portion being correspondingly threaded, there being a pair of spaced apart ribs within the arcuate portion and annular portion adapted to engage the pipe, and a nut threaded on the annular and arcuate portions and adapted to be rotated into engagement with the pipe at the side opposite the pipe-engaging ribs.

9. A pipe clamp comprising a member formed of two annular portions adapted to surround the pipe, the two annular portions being connected by an arcuate portion extending along the pipe at one side thereof, the pipe being exposed at the side opposite the arcuate portion of the clamp, there being a pair of spaced apart pipe-engaging ribs extending longitudinally of the member within the arcuate and annular portions, each annular portion having an external threaded cylindrical surface, one of these surfaces being substantially parallel with the external surface of the pipe and adapted to extend through an opening in a fixed plate, there being a shoulder at one end of this annular member adapted to engage the plate at one end of the opening, a nut threaded on this annular portion and adapted to engage the other side of the plate, the threaded external surface of the other annular portion being inclined at an acute angle to the pipe so as to intersect the same if extended, this threaded surface also extending along the outer surface of the arcuate connecting portion, and a nut threaded on these portions so that when rotated inwardly it will engage the pipe between the annular portions at the side thereof opposite the pipe-engaging ribs.

STEADMAN O. TAYLOR.